June 20, 1950 T. E. QUICK 2,511,992
INTERNAL-COMBUSTION ENGINE
Filed April 11, 1945 2 Sheets-Sheet 2

INVENTOR.
Thomas E. Quick.
BY
Fishburn & Mullendore
ATTORNEYS.

Patented June 20, 1950

2,511,992

UNITED STATES PATENT OFFICE 2,511,992

INTERNAL-COMBUSTION ENGINE

Thomas E. Quick, Wichita, Kans.

Application April 11, 1945, Serial No. 587,673

5 Claims. (Cl. 123—32)

This invention relates to internal combustion engines of the direct injection type and has for its principal object to provide a method and structure for effecting more efficient combustion and greater horsepower per cubic inch of piston displacement from the fuel consumed.

A further object of the invention is to provide a method and means for effecting a more complete and rapid breaking up and co-mingling of the air and fuel charges admitted into the combustion or firing chamber of injection type engines.

A further object of the invention is to produce and maintain an exceptionally high degree of turbulence, agitation between the air and fuel particles, relative movement during ignition so that unburned fuel particles are being constantly swept by air particles to sweep away inert gases surrounding the particles, and assure rapid, substantially complete combustion.

Other objects of the invention are to provide for automatically varying the speed of combustion with the operating speed of an internal combustion engine; to provide a method of effecting combustion which permits more rapid injection of the fuel; to provide a short burning time in which substantially complete combustion takes place in a manner to prevent fire radiance and radiant heat losses; to provide agitation by effecting relative short puffs or gusts of thin, sheet-like films of air bouncing in crisscross fashion from side to side of the combustion chamber in diverse linear directions and at different elevations transversely of the fuel spray; and to maintain such agitation throughout the relatively short burning time.

A further object is to promote consumption of oxygen of the air in rapid combustion of hydrocarbon fuels, such as fuel oil, at a rate comparable to or even faster than that obtained by 100 octane fuels without using an excess of fuel, by utilizing the inertia of the heavier particles of fuel together with the rapid changes of the position of the air due to the slightly higher and lower pressure waves or impulses caused to exist in the air for maintaining a high relative velocity between the fuel and air by first causing a crisscross flow of thin short streams of oxygen bearing air and permitting collision of these thin streams to cause said changes of position, pressure waves, or impulses for maintaining high relative motion between the oxygen of the air and the fuel, instead of relying on flame propagation and diffusion of highly volatile vapors of 100 octane gasoline for a high rate and more complete consumption of the oxygen.

A further object of the invention is to effect more complete consumption of oxygen in a direct injection engine during the most effective part of the working stroke by producing a large unit air stream area per unit of combustion chamber volume at any instant during the time combustion is desired for the purpose of effecting greater presentation of oxygen to the particles of combustible fuel in the short limited time required for efficient combustion.

Another object is to prevent harmful detonation and inefficient spontaneous combustion in the combustion chamber of an engine, and providing instead progressive uniform high speed efficient combustion by providing a high degree of kinetic energy of the air in the form of violent agitation or numerous cross currents and pressure impulses or waves in all parts of the combustion chamber during the time of the existence of fuel in the chamber.

Another object is to prevent fuel particle or droplet growth or accumulation during fuel injection into the combustion chamber by scattering of the fuel with a series of currents of air across the path of fuel injection to sweep the particles of fuel as they slow down aside from the path of injection so that they will not be overtaken by the following fuel.

Another object is to provide for shorter combustion time for less radiant heat loss and higher cycle efficiency by providing violent agitation of the air, in the manner above described, at the time fuel is injected.

Another object is to effect rapid progressive heat release in the combustion chamber of a direct injection engine by utilizing a plurality of wide thin streams of air to provide and maintain a high relative motion between the air and fuel particles for greater collision, contact and chemical union of the oxygen of the air and the fuel whereby heat is released.

Another object is to produce violent agitation of the air in the combustion chamber of an engine for high speed efficient combustion by providing means for and causing exceedingly rapid dissipation of kinetic energy at the time fuel is injected.

In accomplishing these and other objects of the invention, hereinafter pointed out, I have provided an improved method and structure illustrated in the accompanying drawings wherein:

Fig. 1 is a vertical section through the cylinder and combustion or firing chamber of a direct injection engine constructed in accordance with the present invention and with which my improved methods of fuel preparation and combustion are effected.

Fig. 2 is an enlarged section through the upper end of the cylinder or piston chamber and illustrating jetting of the air charge into the combustion chamber just prior to injection of the fuel charge and illustrating transformation of the air jets into numerous thin films bouncing back and forth across the firing chamber for maintaining the desired relative motion and force required in preparing and burning the fuel charge.

Figure 1:
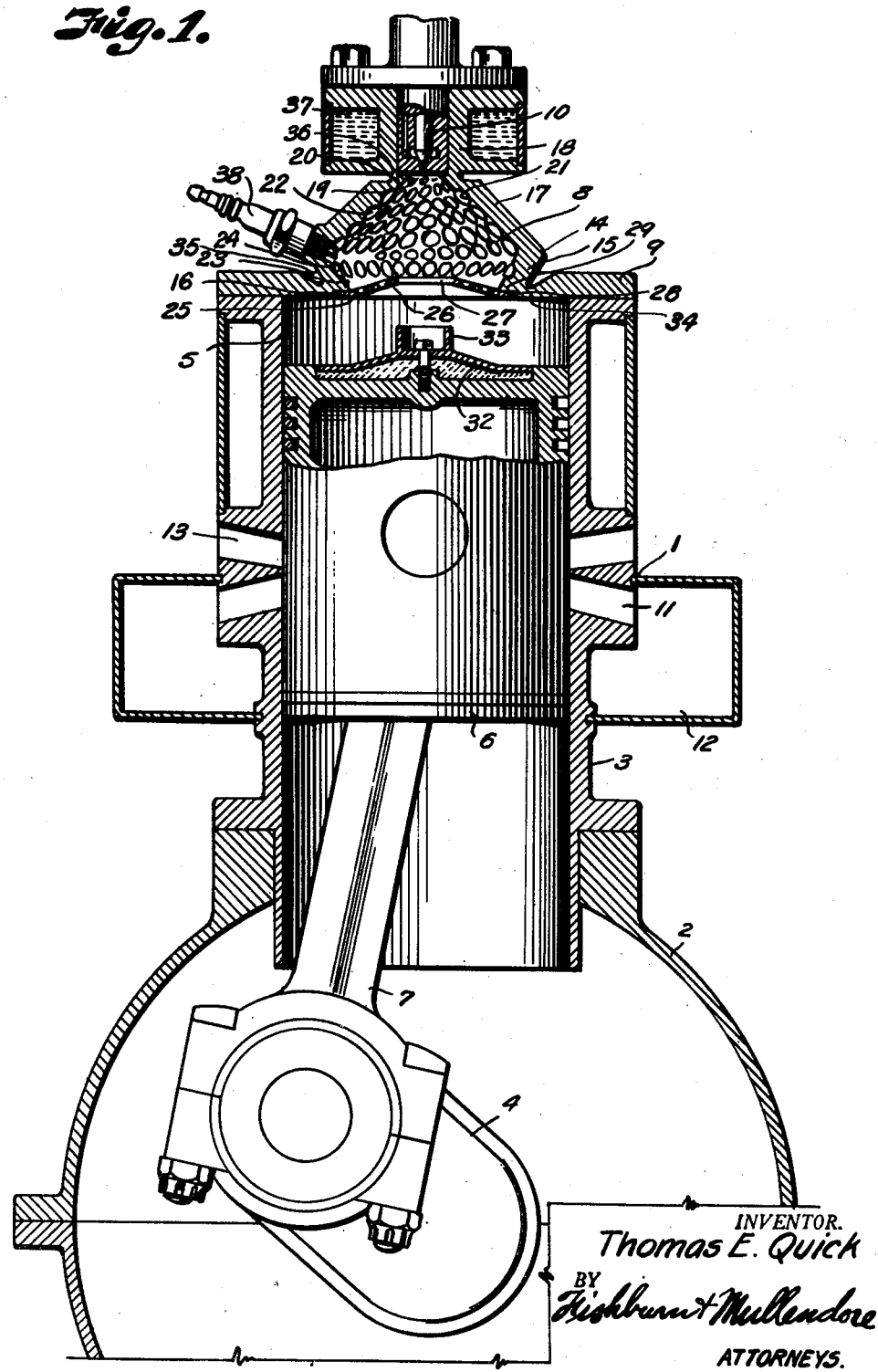

Referring more in detail to the drawings:

1 designates an internal combustion engine of the direct injection type and which includes a crankcase 2 supporting a cylinder block 3 and housing a crankshaft 4. The cylinder block has the usual piston or cylinder chamber 5 in which a piston 6 is reciprocated by means of a rod 7 connected with the crankshaft 4, the crankshaft being maintained in rotation responsive to combustion of fuel charges in a combustion chamber 8 and acting on the head of the piston 6 on the downstroke thereof. The open end of the cylinder chamber is closed by a plate-like head 9 carrying the combustion or firing chamber 8 into which the fuel is discharged in spray form by means of an injector nozzle 10. Combustion supporting air is admitted to the cylinder chamber through a circumferential series of ports 11 located in the walls of the combustion chamber and connected with a supply manifold 12. Adjacent the ports 11 is a circular series of exhaust ports 13 through which spent products of combustion are discharged from the cylinder at the end of the power stroke of the piston.

In operation of engines of this character, combustion supporting air is discharged into the cylinder when the piston uncovers the ports 11, and at the time the crank is moving across lower dead center position. As the crank moves toward upper dead center position, the piston again closes the ports and compresses the air charge thereahead for discharge into the firing chamber at a pressure and temperature sufficient to effect ignition of the fuel when the fuel is ejected through the nozzle 10.

In engines of this character constructed prior to the present invention, a certain amount of turbulence has been effected by directing the air so that it produces a rotary swirl within the firing chamber in an attempt to effect a combustible fuel mixture. This method of producing turbulence, however, defeats and destroys the turbulence necessary to break up the air and fuel charges and form a rapidly combustible mixture.

This is readily understood when it is considered that in any fluid mass under rotation, all of the particles are forced to travel in a curved path and the inertia of the particles which travel the fastest forces them to take an outside circle and the centrifugal force serves to retain them there, while the particles traveling next in speed form a similar circle within the inside ring of the fastest moving particles, and so on, with the slower particles taking position closer to the center of the swirl. Continued rotation tends to compact the mass and hold the particles from relative motion. Thus, whatever turbulence which may have existed when rotation began immediately smooths out into a uniformly rotating and compact mass substantially without turbulence. This rotation produces centrifugal force and since the injected fuel particles are several hundred times heavier than the air particles, the fuel droplets are drawn to the outside walls of the combustion chamber and are caused to move with the swirling mass in contact with the wall of the combustion chamber.

Thus, instead of breaking up and co-mingling the air and fuel charges, the fuel and air charges are actually separated with the result that previous engines are inefficient and incapable of producing maximum power from the fuel consumed.

Furthermore, as the outside layer or particles of fuel burns, a jacket of inert gas is formed and without relative movement it is impossible for oxygen to reach the inner unburned portion of the fuel particles. This is known as fuel smother or fuel lock and greatly retards combustion, therefore, it is impossible to apply the desired amount of energy to the piston as useful power.

In overcoming the above-mentioned difficulties, I have provided a piston, cylinder head, and combustion chamber of special formation so that the air charge compressed in the piston chamber is discharged in a plurality of high velocity jets into the combustion chamber, which jets are caused to be deflected transversely across the combustion chamber to the opposite side and re-deflected in all directions to intercept other deflected films of air to maintain high velocity and relative movement of particles in substantially linear direction and also prevent mass rotary motion while the fuel charge is being sprayed into the combustion chamber.

In carrying out the invention, the combustion chamber 8 has an annular wall 14 having a base portion 15 flaring outwardly from the cylinder head 9 and encircling an opening 16 in the head which is preferably of smaller diameter than the cylinder. The flaring portion 15 of the wall 14 terminates a short distance from the cylinder head in an inwardly extending substantially conical wall portion 17 to connect with a chamber 18 in which the nozzle 10 is mounted. The nozzle discharges into the combustion chamber through an opening 19 formed at the apex 20 of the wall portion 17. The inner face of the wall portion 17 flares in substantial conformity with the fuel spray discharged from the nozzle. In order to deflect and re-deflect the films of air as above mentioned, the inner face is provided with a plurality of individually deflecting portions 21 formed in the bottoms of closely arranged recesses or pockets 22. The recesses 22 are preferably sphere segments in formation and are arranged in spiral series from the base of the wall portion 17 to the apex thereof as clearly shown in Fig. 2, and whereby the recesses or pockets 22 are staggered relative to each other to more efficiently scatter the deflected films of air. The inner face 23 of the wall portion 15 also has a circular series of spiral deflecting surfaces 24 to deflect upwardly and transversely of the combustion chamber any downwardly deflected films of air and particles of fuel when the fuel is discharged into the combustion chamber.

Figure 2:
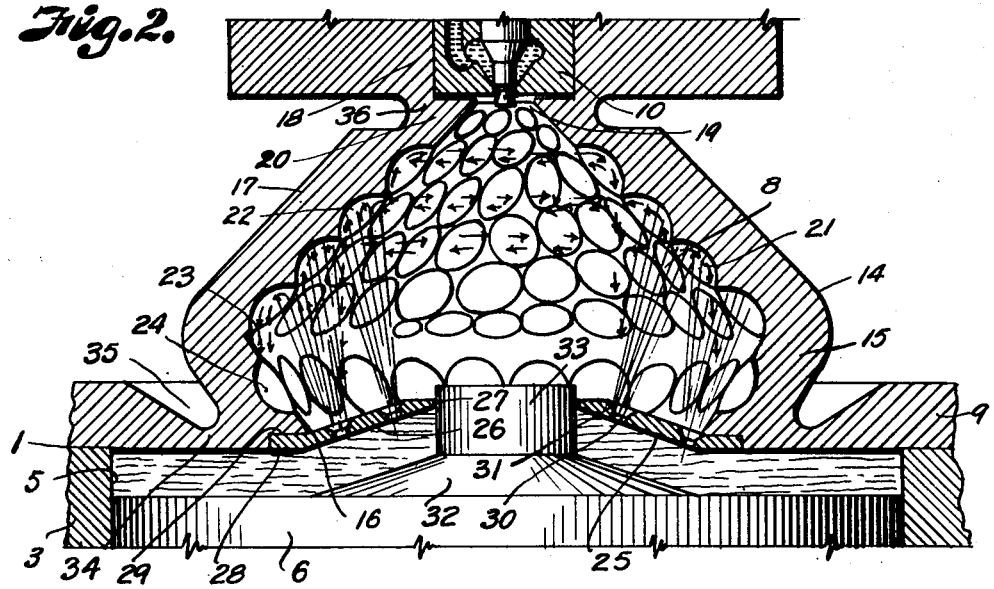
Figure 3:
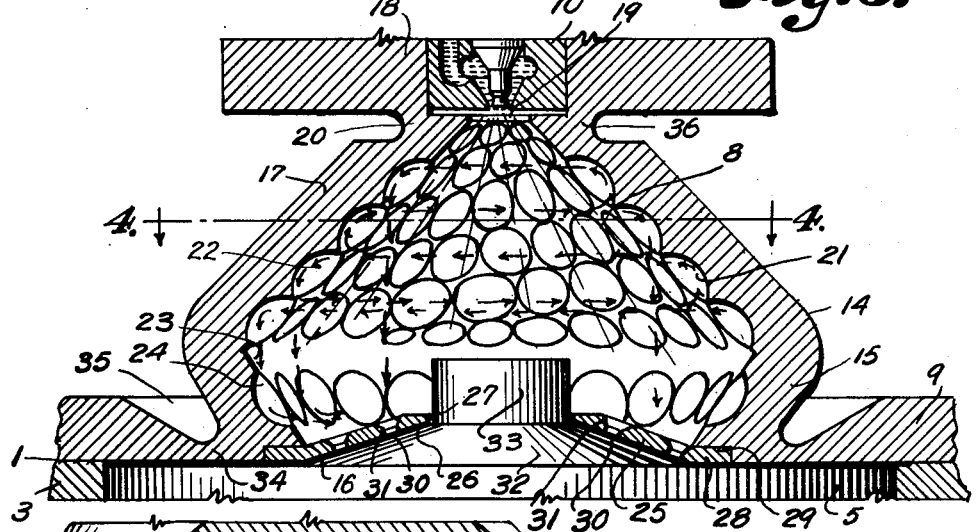
Fig. 3 is a similar view showing the piston at top dead center and injection of a fuel spray into the violently moving and colliding films of air for breaking up the fuel into minute particles and assuring continuous contact of the fuel particles by the particles of moving air so as to promote an extremely rapid and efficient burning of the fuel in a relatively short crank travel.

In order to produce the high velocity jets above-mentioned, the opening 16 is closed by a divider plate 25 having a conical portion 26 sloping upwardly and inwardly of the combustion chamber and encircling an axial opening 27 through which gases resulting from combustion expand against the head of the piston and through which the air charge is initially compressed in the combustion chamber as later described. The rim 28 of the plate is seated against a shoulder 29 inset within the cylinder head so that the rim of the plate is flush with the inner face of the cylinder head. The plate 25 may be secured to the shoulder by suitable fastening means as desired. The conical portion of the plate has a plurality of orifices 30 extending therethrough from the cylinder side and terminating in outwardly flaring outlets 31 on the combustion chamber side as best shown in Figs. 2 and 3.

In order to effect differential pressure between the cylinder chamber and the combustion chamber, the head of the piston is shaped to conform with the underface of the cylinder head and the central portion thereof has a conical projection 32 conforming to the conical shape of the orifice plate and which carries at the apex thereof a stopper-like projection 33 which closes the opening 27 as the piston approaches the cylinder head to trap a portion of the air between the piston and cylinder heads to be compressed at substantially higher pressure than the portion of air charge trapped within the combustion chamber. This differential allows expansion of the higher pressure air through the orifices 30 in the form of high velocity jets.

In order to reduce the heat exchange from the combustion zone to the cylinder and maintain a high combustion chamber temperature the portion of the cylinder head surrounding the wall of the combustion chamber is relatively thin as indicated at 34 to limit heat exchange between the combustion chamber and adjacent parts of the engine cylinder. The wall portion 16 is also spaced from the surrounding portion of the cylinder head as indicated at 35. Since a high temperature is to be maintained in the combustion chamber, the nozzle chamber is preferably connected with the combustion chamber through a relatively thin wall portion 36 surrounding the opening 19 and the nozzle chamber is surrounded by a jacket 37 through which a cooling fluid is circulated as will be well understood by those skilled in the art. The combustion chamber may be provided with a conventional spark plug 38 for assisting in the ignition of the fuel upon starting of the engine or when the engine is operated in accordance with the semi-Diesel type.

In operating an engine constructed as described, it is assumed that combustion supporting air is being delivered to the ports 11 through the manifold 12 at a desired initial pressure which may be substantially atmospheric or at a higher pressure to supercharge the cylinder when the piston uncovers the ports 11, and it is also assumed that fuel which may be a liquid is being delivered under pressure sufficient to spray the fuel into the combustion chamber at the maximum air pressure effected therein and that the nozzle is actuated in timed relation with the piston so as to introduce a fuel charge at the proper time: for example, when the piston reaches a position where the crank shaft is about five to fifteen degrees of top dead center.

Figure 4:
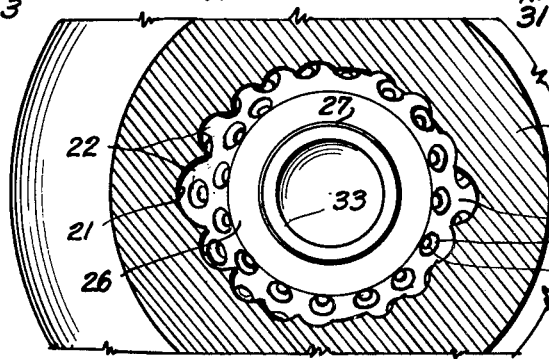
Fig. 4 is a horizontal section through the firing chamber on the line 4—4 of Fig. 3.

The piston closes the air inlet and exhaust ports on movement of the crank 4 toward upper dead center position. The air charge trapped in the cylinder is progressively compressed in the cylinder and combustion chamber so that the respective bodies of air therein are substantially the same pressure. As the piston approaches the cylinder head, the projection 33 thereon enters the opening 27 so that the body of air above the piston is trapped between the piston and cylinder head and further upper movement of the piston increases the pressure of this body of air substantially above the pressure of the body of air trapped in the combustion chamber, so that it expands through the orifices into the combustion chamber in a plurality of high velocity jets which impinge in the pockets 22 provided in the inner face of the wall portion 15 and are deflected transversely of the combustion chamber 8 in a plurality of thin films of air in diverse directions transversely across the combustion chamber to be re-deflected by the pockets in the opposite wall to other of the pockets until the air streams are bouncing back and forth in linear paths as shown in Figs. 2 and 4 until they collide with each other and thereby producing high velocity pressure impulses. At the proper interval, for example, when the crank is approximately fifteen degrees of top dead center, the nozzle 10 opens and a charge of fuel is injected in spray form into the linearly moving streams of air to be contacted thereby and broken into small particles and oxidized. Any fuel droplets that may contact the wall of the combustion chamber are immediately returned therefrom by the high velocity streams of air (Fig. 3) and moved toward the center of the combustion chamber where they are met by other streams of air and rapidly consumed in combustion. Since the air in the combustion chamber is sufficiently heated through compression by the time the piston reaches the position where the fuel nozzle opens, combustion of the fuel begins substantially simultaneously with the fuel injection and continues even after the crank passes top dead center position, at which time the fuel injection ceases. However, the inertia imparted to the portions of the air stream and fuel maintains high velocity agitation of the particles in linear paths so that the air and fuel particles are co-mingled and the fuel particles are readily burned.

The constant movement of the burning particles and contact thereof by other particles sweep away the inert gases and maintain contact of the burning particles with fresh particles of other air streams to effect substantially rapid and complete combustion of the fuel so that optimum combustion is effected by the time the piston begins its power stroke. Thus, the maximum energy in the fuel is applied through the piston as useful power.

From the foregoing it is obvious that my invention overcomes incomplete fuel and air mixture, fuel lock, detonation and other combustion difficulties usually encountered in injection type engines as heretofore constructed and operated.

What I claim and desire to secure by Letters Patent is:

1. A method of effecting combustion of a fuel in a combustion zone including discharging a combustion supporting medium into the combustion zone in a plurality of high velocity jets in directions to avoid initial head-on collision of said jets, deflecting the jets into a plurality of substantially thin films moving transversely across the combustion zone, introducing a fuel in finely divided form across the path of said films while effecting combustion, and accelerating combustion by maintaining repeated deflection and collision of said films in diverse directions for sustaining contacts with the fuel particles from different directions and at different velocities during combustion.

2. A method of effecting combustion of a fuel in a combustion zone including discharging the combustion supporting medium into the combustion zone in a plurality of high velocity jets in directions to avoid initial head-on collision of said jets, deflecting the jets into a plurality of substantially thin films moving transversely across the combustion zone, introducing a fuel in finely divided, thin wide spread conical form across the path of said films while effecting combustion, and accelerating combustion by maintaining repeated deflection and collision of said films in diverse directions for sustaining contacts with the fuel particles from different directions and at different velocities during combustion.

3. A method of effecting combustion of a fuel in a combustion zone including discharging the combustion supporting medium into the combustion zone in a plurality of high velocity jets in directions to avoid initial head-on collision of said jets, effecting rebound of the jets in a plurality of substantially thin films transversely of the combustion zone, introducing a fuel in finely divided form across the path of said films while maintaining combustion, accelerating combustion by causing said films to move in collision and split into a plurality of streams in diverse directions, and again effecting rebound of said streams to convert said streams into thin films and causing collision of said films for maintaining contacts with the fuel particles from ever changing directions and at different velocities during combustion.

4. A method of effecting combustion of a fuel in a combustion zone including discharging the combustion supporting medium into the combustion zone in a plurality of high velocity jets in substantially parallel directions to avoid initial head-on collision of said jets, effecting rebound of the jets in a plurality of substantially thin films transversely of the combustion zone at substantially right angles to the direction of the jets, introducing a fuel in finely divided form across the path of said films while maintaining combustion, and accelerating combustion by causing said films to move in collision and split into a plurality of streams in diverse directions, and again effecting rebound of said streams to convert said streams into thin films and causing collision of said films for maintaining contacts with the fuel particles from changing directions and at different velocities during combustion.

5. The method of effecting combustion of a fuel in the combustion zone including discharging a combustion supporting medium into the combustion zone of a plurality of high velocity jets in directions to avoid initial head-on collision of said jets, deflecting the jets into a plurality of substantially thin films moving transversely across the combustion zone, introducing a fuel in finely divided form from the opposite direction relative to the direction of the jets and across the path of said films while effecting combustion, and accelerating combustion by maintaining repeated deflection and collision of said films in diverse directions for sustaining contacts with the fuel particles from different directions and at different velocities during combustion.

THOMAS E. QUICK.

REFERENCES CITED

The following references are of record in the file of this patent:

UNITED STATES PATENTS

| Number | Name | Date |
|---|---|---|
| 1,341,478 | Platt et al. | May 25, 1920 |
| 1,560,556 | Ford | Nov. 10, 1925 |
| 1,696,799 | Held | Dec. 25, 1928 |
| 1,977,752 | Baj | Oct. 23, 1934 |
| 2,002,482 | Kimball | May 21, 1935 |
| 2,002,483 | Kimball | May 21, 1935 |
| 2,010,469 | Triebnigg | Aug. 6, 1935 |
| 2,076,030 | Kahllenberger | Apr. 6, 1937 |
| 2,093,592 | Triebnigg | Sept. 21, 1937 |
| 2,100,143 | Mock | Nov. 23, 1937 |
| 2,113,601 | Pratt | Apr. 12, 1938 |
| 2,113,602 | Pratt | Apr. 12, 1938 |
| 2,142,280 | Mock | Jan. 3, 1939 |
| 2,157,764 | Langrognet | May 9, 1939 |